United States Patent
Nix et al.

(10) Patent No.: US 7,546,207 B2
(45) Date of Patent: Jun. 9, 2009

(54) TURN-BY-TURN NAVIGATION SYSTEM WITH ENHANCED TURN ICON

(75) Inventors: Axel Nix, Birmingham, MI (US); Andrew W. Gellatly, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 813 days.

(21) Appl. No.: 10/851,035

(22) Filed: May 21, 2004

(65) Prior Publication Data

US 2005/0273252 A1   Dec. 8, 2005

(51) Int. Cl.
*G01C 21/26* (2006.01)
*G01C 21/36* (2006.01)

(52) U.S. Cl. .................. 701/211; 701/36; 340/995.2

(58) Field of Classification Search .................. None
See application file for complete search history.

(56) References Cited

U.S. PATENT DOCUMENTS

| | | | | |
|---|---|---|---|---|
| 5,323,321 | A * | 6/1994 | Smith, Jr. ................ | 701/211 |
| 5,565,874 | A | 10/1996 | Rode | |
| 5,595,874 | A | 1/1997 | Hogan et al. | |
| 5,724,316 | A * | 3/1998 | Brunts ................... | 368/10 |
| 5,839,086 | A | 11/1998 | Hirano | |
| 6,405,131 | B1 * | 6/2002 | Barton .................... | 701/211 |
| 6,411,877 | B2 * | 6/2002 | Bockmann et al. ........ | 701/48 |
| 6,650,345 | B1 * | 11/2003 | Saito et al. .............. | 715/764 |
| 6,681,176 | B2 * | 1/2004 | Funk et al. .............. | 701/207 |

FOREIGN PATENT DOCUMENTS

| | | | |
|---|---|---|---|
| DE | 4412859 C1 | * | 11/1994 |
| DE | 10016674 A1 | | 10/2001 |
| DE | 10039687 A1 | | 2/2002 |
| JP | 2002-365081 | * | 12/2002 |

OTHER PUBLICATIONS

Extract from Blaupunkt Catalogue-Travel Pilot RNS 150 (at least prior to May 2002).*

* cited by examiner

*Primary Examiner*—Michael J. Zanelli (57) ABSTRACT

Methods and apparatus are provided for generating turn instructions on a turn-by-turn navigation system. The turn instructions can include a turn icon as well as visual and audio prompts. A countdown bar is typically embedded within the turn icon to provide upcoming turn information in intuitive graphic form, in order to reduce driver distraction. The turn-by-turn navigation system can generally be produced more economically than a typical premium system having a full complement of costly features, such as a color map display. Moreover, the turn-by-turn navigation system can be configured with only those features deemed most useful to a broad-based market segment, in order to further reduce manufacturing costs.

6 Claims, 7 Drawing Sheets

TURN-BY-TURN NAVIGATION SYSTEM WITH ENHANCED TURN ICON

TECHNICAL FIELD

The present invention generally relates to navigation systems for automobiles, and more particularly relates to a turn-by-turn navigation system integrated with an automobile radio.

BACKGROUND

Recent trends in automobile technology have included the development of navigation systems incorporated within the driver control cluster. These navigation systems are generally designed to help a driver reach a specific destination without using a physical road map. As such, an automobile navigation system can make the driving experience more convenient and enjoyable.

In addition to providing basic driving directions, some navigation systems also supply resource locations, such as restaurants, hospitals, points of interest, and so forth. However, as new features and capabilities are added to automobile navigation systems, the interaction between driver and navigation system can become relatively complex. Therefore, it is desirable to have a driver-to-navigation system control interface that is both convenient and intuitive, in order to minimize driver distraction.

Another consideration affecting the design of automobile navigation systems is the cost associated with implementing various sophisticated features, such as color map displays, synthesized speech commands, touch screens, and the like. As such, the cost/feature trade-off typically becomes a determining factor regarding the degree of complexity designed into a navigation system for the consumer market. Furthermore, the relatively high cost of current "premium" navigation systems, which typically include a profusion of high-tech features, generally limits their marketability to the luxury, or near-luxury, car market.

Accordingly, it is desirable to provide a relatively low cost automobile navigation system that provides route guidance information to a typical consumer/driver. In addition, it is desirable that the low cost automobile navigation system be incorporated into the automobile audio system for convenient and intuitive operation. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for presenting turn instructions on an automobile navigation system display. One method comprises the steps of graphically generating a turn icon on the display and embedding a countdown bar within the displayed turn icon, such that the countdown bar starts out completely filled and becomes increasingly empty as the vehicle approaches a turn point.

One device comprises a vehicle navigation system having a control unit with a visual display. The exemplary control unit is typically integrated into the audio system of the vehicle, which can include various types of radio reception, such as AM, FM, SDARS, and RDS, among others. A processor is typically electrically coupled to the control unit, and to a database and a vehicle location apparatus, such as a GPS receiver. The exemplary processor is configured to receive vehicle position data from the vehicle location apparatus, retrieve destination information from the database, calculate a turn-by-turn route to the destination, and generate instructions and graphics, such as a turn icon image on the visual display. The turn icon image is enhanced by the addition of an embedded countdown bar that starts out completely filled and becomes increasingly empty as the vehicle approaches a turn point.

The database typically contains road-network/address information, and may also contain Point of Interest (POI) information. In addition, the exemplary navigation system generally includes voice prompts that are synchronized with the visual instructions and graphics, such as the enhanced turn icon, to help the driver navigate accurately, and with minimum visual distraction. The exemplary navigation system typically utilizes turn-by-turn instructions in place of a color map display, and provides those features generally considered to be most useful for a shopping/commuting type of driver. As such, the exemplary system represents an effective and economical alternative to a relatively high cost premium navigation system.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of automobile navigation systems. The exemplary embodiments disclosed herein are particularly configured for the type of user/driver that represents a broad segment of the consumer market. That is, the exemplary navigation system embodiments are especially configured for ease of use, flexibility, and minimal driver distraction. Moreover, the navigation system controls are integrated into the vehicle audio system for added convenience and intuitive operation. The exemplary embodiments provide a wide range of audio and navigation capabilities, while at the same time eliminating certain types of high cost features (e.g., a color map display) having relatively low perceived utility to certain users. As such, the exemplary embodiments represent effective, lower cost alternatives to the premium types of automobile navigation systems.

Figure 1:
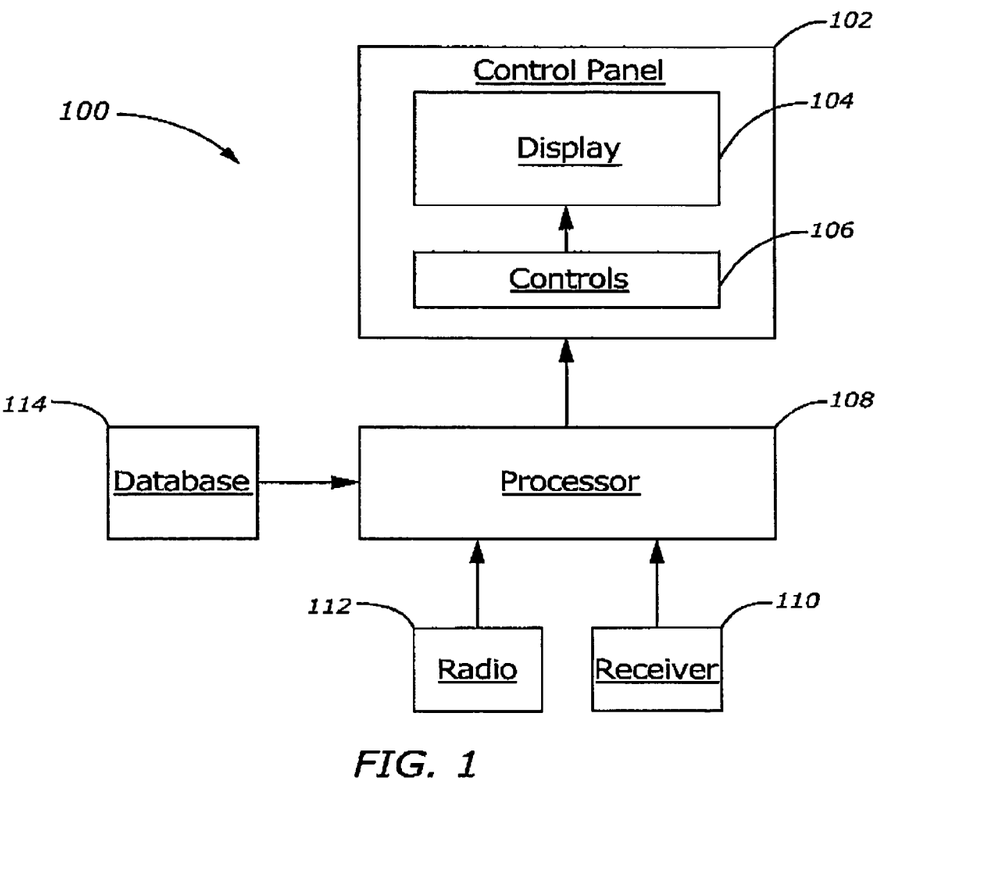
FIG. 1 is a block diagram of an exemplary automobile navigation system.

According to an exemplary embodiment of an automobile navigation system 100, as shown in the simplified block diagram of FIG. 1, a control panel 102 provides the interface between the driver and system 100. Control panel 102 typically includes a visual display 104 and a set of manual controls 106, such as buttons, knobs, and the like. A processor 108 manages the flow of data between control panel 102 and the various input devices, including a Global Positioning Satellite (GPS) receiver 110, a radio 112, a database 114 and/or the like.

Processor 108 may be any type of microprocessor, microcontroller, or other computing device capable of executing instructions in any computing language. GPS receiver 110 provides vehicle positioning information to processor 108, typically via an external GPS antenna (not shown), or any other suitable device. Radio 112 is generally connected to an external AM/FM antenna (not shown), for receiving AM and FM broadcast transmissions, and can also be configured to receive other types of signals, such as satellite digital audio radio service (SDARS) and RDS (Radio Data System) signals. Database 114 is typically configured to provide map data, such as road-network/address data for the U.S. and Canada, to processor 108. In addition, database 114 can be further configured to provide other types of data, such as Point Of Interest (POI) data. Database 114 can be implemented by a form of disk media, such as CD, DVD, and the like, or can be implemented by any other suitable type of media, such as flash memory cards or the like. Database 114 may also be configured to provide audio playback capabilities, including CD, DVD, MP3, WMA, and so forth.

Figure 2:
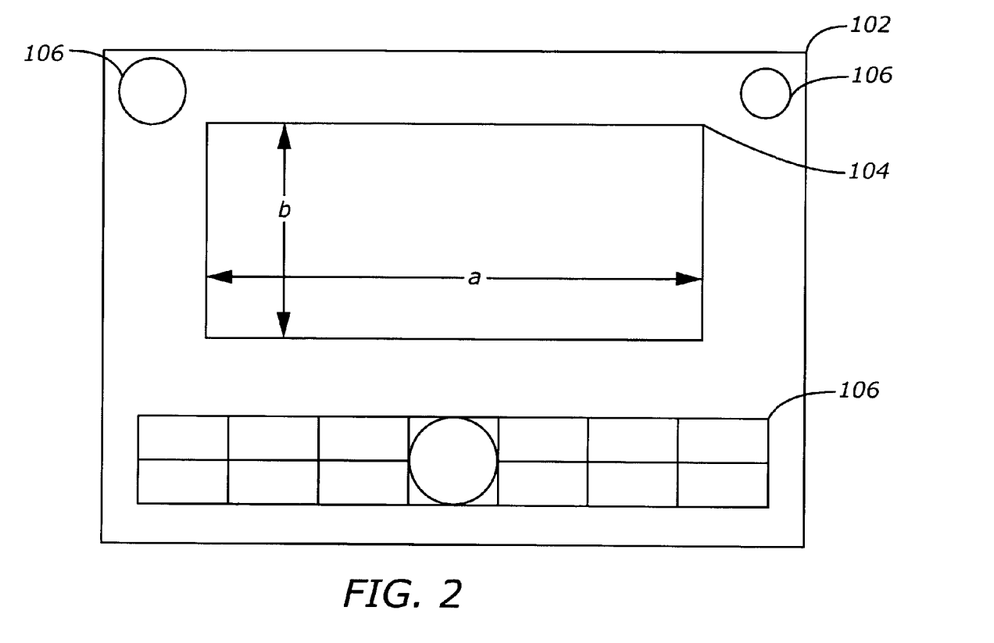
FIG. 2 is an illustration of an exemplary control panel for an automobile navigation system.

One exemplary physical embodiment of control panel 102 is illustrated in FIG. 2. Control panel 102 can be mounted in any suitable location that allows the driver to conveniently read the data on display 104 and to access controls 106. Display 104 may be sized to be capable of displaying at least 5 lines of 24 characters each, with a minimum character height of approximately 5 mm, although other embodiments may have any dimensions and display resolution. These parameters generally result in a display 104 having dimensions of approximately 125 mm minimum width (a) and approximately 47 mm minimum height (b). In general, LCD technology is used to produce the display characters, although any other suitable display technique (e.g., plasma or the like) may be used. Controls 106 are suitably configured to provide a combination of buttons and knob(s) that enable the driver to conveniently and intuitively access both the radio and navigation features, as will be described in further detail below.

Figure 3:
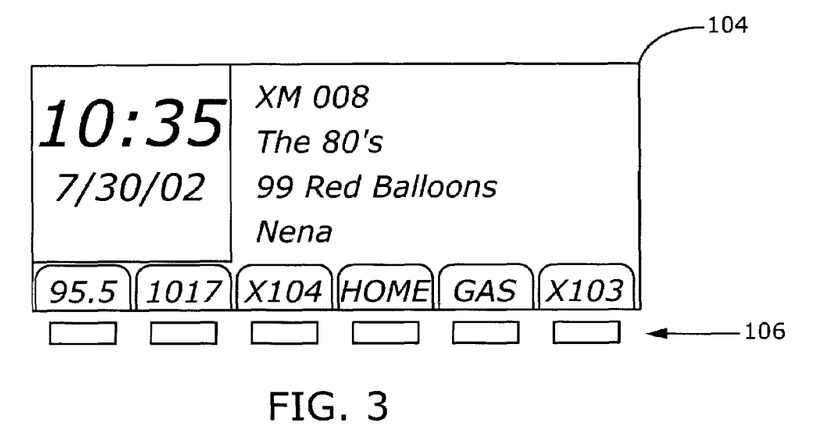
FIG. 3 is an illustration of an exemplary control panel display in the "Radio Only" mode.

According to one exemplary embodiment, control panel 102 can be configured to operate in three distinct display modes, which can be toggled by pressing an appropriate button 106 or other control on display 102. In the exemplary embodiment, the three display modes are characterized as "Radio Only" mode, "Navigation Only" mode, and "Split Radio/Nav" mode. Exemplary embodiments of the three display modes are illustrated in FIGS. 3, 4 and 5.

The "Radio Only" display mode is typically designated as the default mode, where the driver has not requested navigation information. As shown in FIG. 3, the "Radio Only" mode can be configured to display time and date information from processor 108, as well as radio 112 reception data, on display 104. In the FIG. 3 example, radio 112 is shown as receiving satellite (e.g., XM) data. In similar fashion, AM and FM data would typically be displayed if those modes were selected by the driver. Display 104 can also be configured to display additional selection choices (e.g., 95.5, 1017, X104, etc.) using associated controls 106, as illustrated in FIG. 3.

Figure 4:
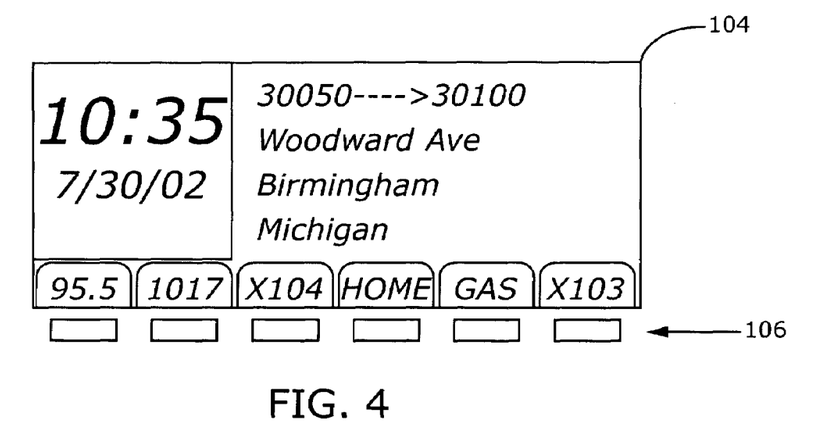
FIG. 4 is an illustration of an exemplary control panel display in the "Navigation Only" mode.

An exemplary "Navigation Only" display mode is shown in FIG. 4. In this embodiment, the vehicle location is displayed in addition to time and date information. Vehicle location is typically displayed as a default function in a Navigation mode, prior to a driver request for destination routing information.

Figure 5:
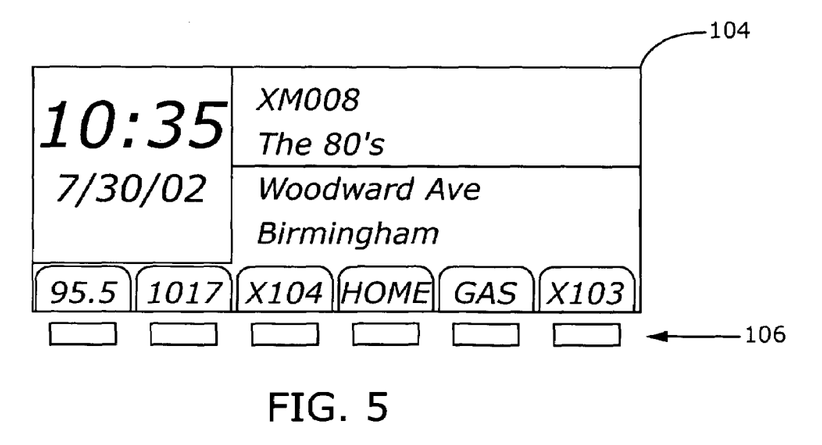
FIG. 5 is an illustration of an exemplary control panel display in the "Split Radio/Nav" mode.

An exemplary "Split Radio/Nav" display mode is illustrated in FIG. 5. In this example, the audio data (XM) and navigation data (e.g., vehicle location) are displayed on a split screen portion of display 104, in addition to the time and date display portion. Other multi-function display mode embodiments could be used as well, such as Picture-within-Picture (PIP) and similar types of graphical combinations.

Figure 6:
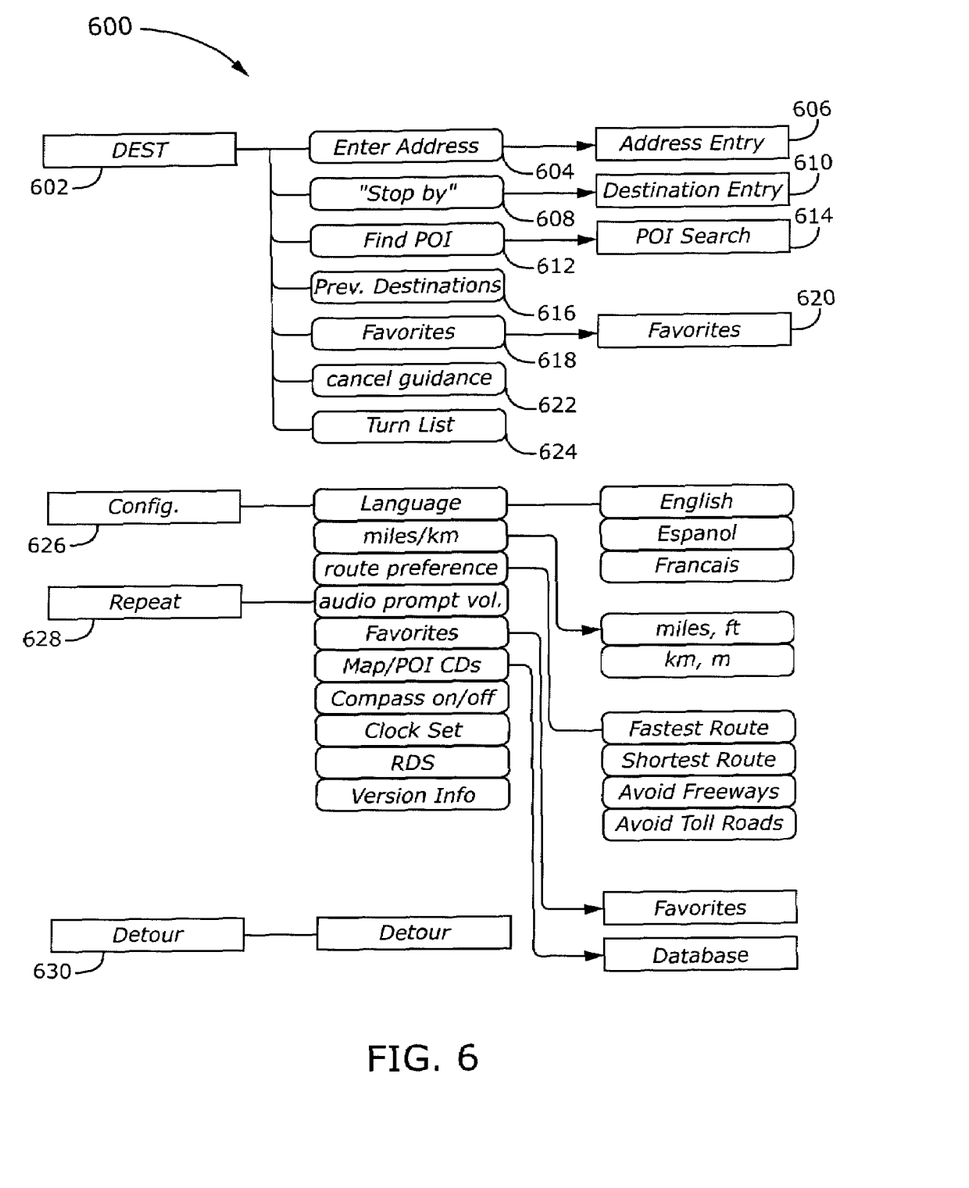
FIG. 6 is a flow diagram of an exemplary control sequence for an automobile navigation system.

In accordance with one exemplary embodiment of an automobile navigation system, a top-level menu of selections 600 available in system 100 (FIG. 1) is illustrated in FIG. 6. For example, a driver can initiate a route guidance mode by activating "Destination" menu 602 and entering an address 604, 606 via controls 106. Once the address has been entered, the system typically calculates a route from the present vehicle position to the destination address. The driver can also be given additional options, such as making an intermediate stop 608, 610, locating a POI 612, going to a previous destination 616, or to a "Favorite" destination 618, 620. The driver can typically exit the route guidance mode by depressing a soft key, such as "cancel guidance" 622.

Another exemplary feature available in the activated route guidance mode is a "Turn List", which the driver can access by pressing an appropriate soft key 624 in the Destination 602 menu. The Turn List typically displays a summary of distance, direction and turn-into street names of upcoming turns or other types of waypoints. As noted previously, the exemplary embodiments disclosed herein do not typically include a color map display, in order to reduce the cost and complexity of the system. Instead, turn-by-turn information is generally supplied to the driver in both visual and audio forms, as will be described below. As such, the exemplary embodiments disclosed herein can be categorized as "Turn-By-Turn" navigation systems.

Additional exemplary selective modes may also be made available to the driver, as are illustrated in FIG. 6, such as "Configure" 626, "Repeat" 628, and "Detour" 630, among others. The various optional features extending from these additional exemplary modes are generally accessible to the driver through the activation of appropriate sequences of soft keys, as indicated in the respective flow diagrams of FIG. 6.

Figure 7:
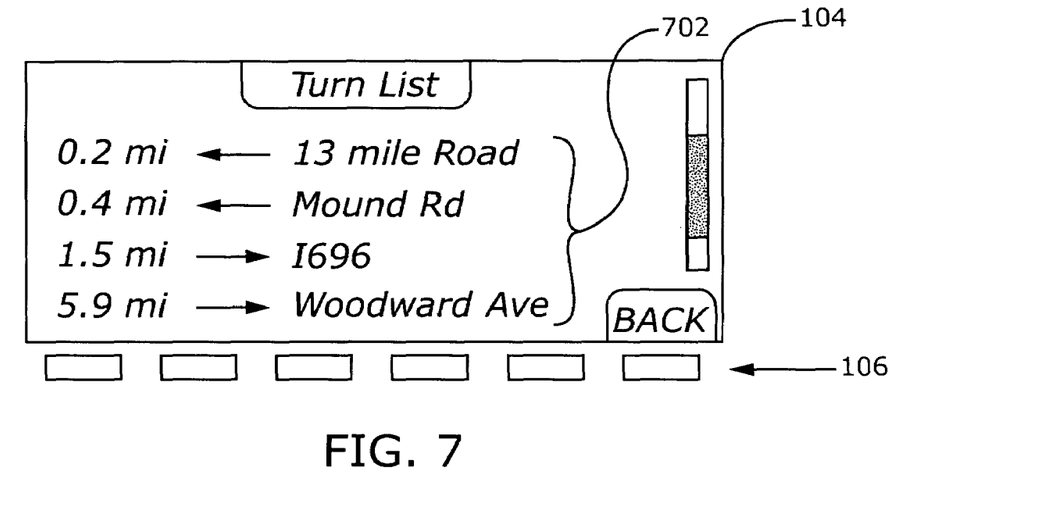
FIG. 7 is an illustration of an exemplary Turn List display.

In an exemplary embodiment of a "Turn-By-Turn" navigation system, one visual form of turn-by-turn information is typically the Turn List, as previously described. An exemplary Turn List 702 is generally shown in tabular form on display 104, as illustrated in FIG. 7. In this display example, the distance, direction, and turn-into street names of upcoming turns are listed in simple, easy-to-read format. For example, the first line in the displayed listing indicates an upcoming left turn, 0.2 miles ahead, into 13 mile Road.

Figure 8:
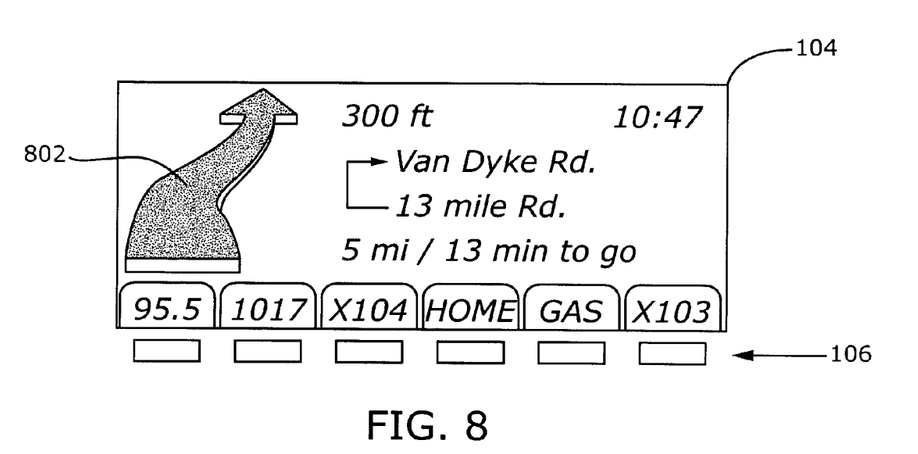
FIG. 8 is an illustration of an exemplary turn icon display in a "Navigation Only" mode.

Another exemplary visual form of turn-by-turn information is shown in FIG. 8, where a turn icon 802 is presented graphically on display 104 to indicate an upcoming turn. Route data is also shown on display 104, as would be typically presented in the "Navigation Only" mode.

In addition to the types of visual displays described herein, various embodiments of exemplary Turn-By-Turn navigation systems generally incorporate audible voice prompts. Voice prompts are typically synchronized with visual turn instructions in order to help the driver navigate to the desired destination with minimal visual distraction. For example, voice prompts can announce an upcoming turn in three steps, as follows:

1) A first voice prompt may suggest: "Prepare to turn".
2) A second voice prompt may announce detailed turn instructions, such as: "Turn right onto 175 north in one half mile".
3) A final prompt may be played immediately before the turn must be made: "Turn right now".

Figure 9:
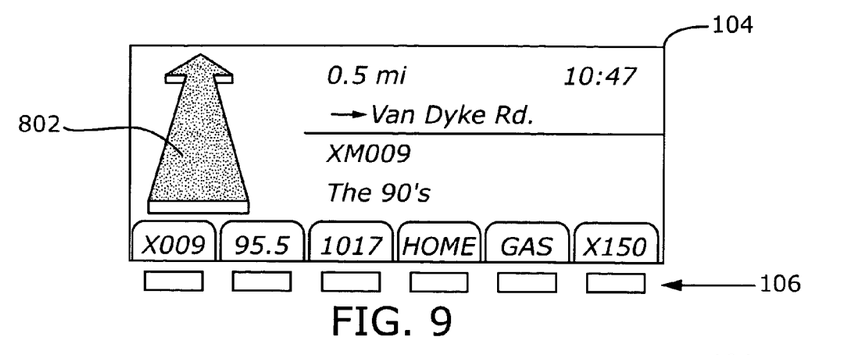
FIG. 9 is an illustration of an exemplary turn icon display in a split "Nav/XM" mode.

To further aid the driver in processing turn information, the previously described turn icon (802 in FIG. 8) can be graphically enhanced in various ways. For example, when an upcoming turn or other waypoint is still a considerable distance away (e.g. on the order of 0.5 miles or so, although other embodiments may use longer or shorter distances) icon 802 can be displayed as an arrow pointing straight ahead, as illustrated in FIG. 9. Also, the exemplary displayed data in FIG. 9 is representative of the Split Radio/Nav mode, where XM is the selected audio mode.

Figure 10:
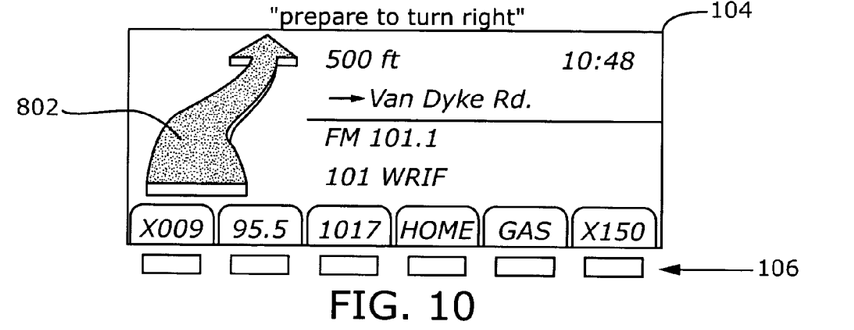
FIG. 10 is an illustration of an exemplary turn icon display in a split "Nav/FM-RDS" mode.

When the vehicle reaches a distance of approximately 500 feet from the upcoming turn, turn icon 802 can be displayed as a bent arrow, as illustrated in FIG. 10. Concurrently, a voice prompt can announce: "prepare to turn right". In this example, the displayed data is representative of the Split Radio/Nav mode, where FM-RDS is the selected audio mode.

Figure 11:
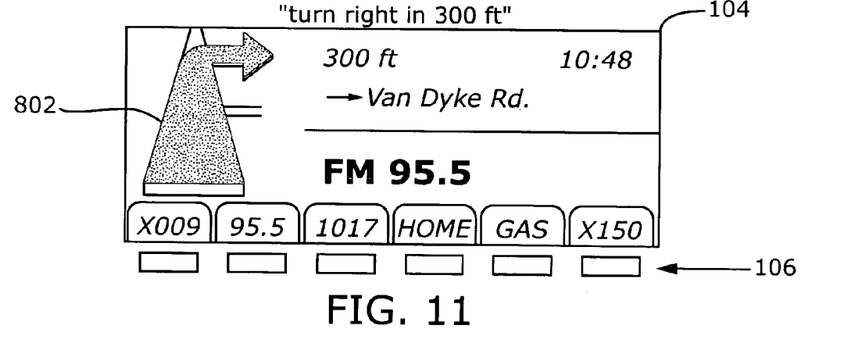
FIG. 11 is an illustration of an exemplary turn icon display in a split "Nav/FM" mode.

When the vehicle begins to approach the upcoming turn, e.g., at about 300 feet, turn icon 802 can be displayed as a right-angle arrow, as illustrated in FIG. 11. Concurrently, a voice prompt can announce: "turn right in 300 feet". In this example, the displayed data is representative of the Split Radio/Nav mode, where FM is the selected audio mode.

Figure 12:
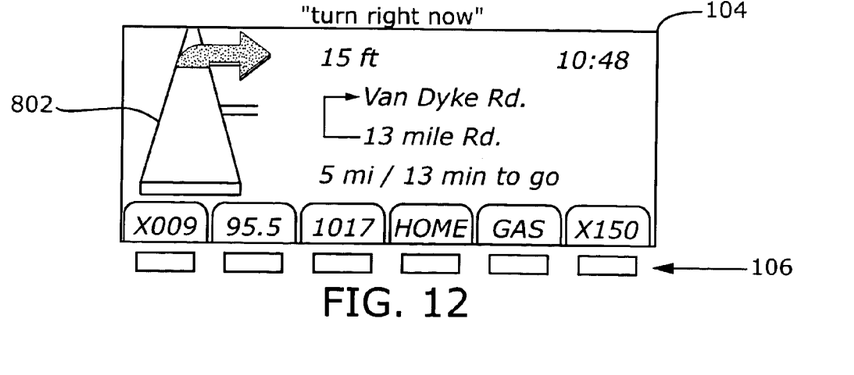
FIG. 12 is an illustration of an exemplary turn icon display with an embedded disappearing countdown bar in a "Navigation Only" mode.

When the vehicle is close to the upcoming turn, e.g., at a distance of about 15 feet, turn icon 802 can revert to a right-angle arrow, as depicted in FIG. 12. Concurrently, a voice prompt can announce: "turn right now". In this example, the displayed data is representative of the Navigation Only mode, with no audio selection.

The graphic image of turn icon 802 can be intuitively enhanced by the addition of a 'countdown' bar superimposed on turn icon 802 that becomes progressively highlighted as the vehicle approaches a turn or other waypoint. That is, turn icon 802 can integrate an embedded countdown bar, which is typically filled (e.g., black) when a turn is not imminent, as shown in FIGS. 9, 10, 11. As the vehicle approaches a turning point, as shown in FIG. 12, the embedded countdown bar can become increasingly blank (e.g., white). Alternate embodiments of an embedded countdown bar integrated with a turn icon can show, for example, a blank bar becoming shaded as the vehicle approaches a turn, or can indicate an upcoming turn by a change in color or intensity of the countdown bar, or through any other manner of highlighting, shading or the like. Various other embodiments of an integrated countdown bar may also be used to allow the changing image (e.g. progressive highlighting) of the embedded countdown bar to indicate the proximity of an upcoming turn.

In general, navigation systems use a separate countdown bar and turn icon, or perhaps a numeric distance-to-turn indicator instead of a graphic representation. In the exemplary embodiments disclosed herein, however, the merging of turn icon and countdown bar into a single image can reduce the driver workload to process information, and can thereby help the driver to make the proper turns with fewer errors.

Accordingly, the shortcomings of the prior art have been overcome by providing an improved automobile navigation system based on a turn-by-turn display concept. Exemplary embodiments of a versatile and economical navigation system are disclosed, with a graphic turn icon and associated visual and voice prompt instructions used in lieu of a costly color map display. The turn icon is enhanced with an embedded countdown bar that is progressively modified as the vehicle nears an upcoming turn. As such, the driver can intuitively anticipate the approaching turn point with fewer distracting glances at the instructions on the display.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A turn-by-turn navigation system implemented within an audio system of a vehicle, the navigation system comprising:
    a control unit having a visual display and selection controls, wherein each of the selection controls are individually configurable to provide either a navigation feature or an audio feature;
    a processor electrically coupled to the control unit and configured to receive selections from the control unit based upon actuation of the selection controls;
    a database comprising road-network/address information and configured to input database information to the processor; and
    a vehicle location apparatus configured to input vehicle location data to the processor;
    wherein the processor is configured to respond to each of the selections to process either the audio feature or the navigation feature, and wherein the processor is further configured to respond to the navigation control by calculating a turn-by-turn route to a selected destination, based on a received destination selection from the control unit and on received road-network/address information from the database, and wherein the processor is further configured to generate instructions and a turn icon image having an embedded countdown bar on the visual display in response to the navigation feature, wherein the embedded countdown bar is progressively highlighted as the vehicle approaches a turn point.

2. The navigation system of claim 1, wherein the processor is further configured to provide voice prompts synchronized with the visual turn instructions on the display.

3. A display for providing directions toward a waypoint for a vehicle having an audio system, the display comprising:
    a navigational information portion providing textual data related to the waypoint;
    an audio information portion providing information relating to the audio system;

a directional arrow graphically representing the directions to the waypoint, wherein the graphical arrow is shaped to represent a turning direction for the vehicle to reach a waypoint and is progressively highlighted as the vehicle approaches the waypoint; and control indicia indicating a function associated with each of a plurality of controls, wherein each control is individually configurable as either a navigation feature or an audio feature.

4. The display of claim 3 wherein the audio information is in the form of voice prompts synchronized with the graphic representations of the directional arrow.

5. A method of providing turn information to a driver on a display associated with a turn-by-turn navigation system implemented within an audio system in a vehicle, the method comprising the steps of:

representing a function on the display associated with each of a plurality of controls, wherein the function is configurable by the user to represent either a navigation feature or an audio feature;

in response to user activation of the navigation feature, generating a turn icon on the display and embedding a countdown bar within the displayed turn icon, wherein the countdown bar is progressively highlighted as the vehicle approaches a turn point; and in response to user activation of the audio feature, processing the activated audio function.

6. The method of claim 5 wherein generating step comprises synchronizing voice prompts to the progressive highlighting of the countdown bar via the audio system.

* * * * *